United States Patent [19]

Tusim

[11] Patent Number: 4,912,140

[45] Date of Patent: Mar. 27, 1990

[54] EXPANDABLE AND EXPANDED ALKENYL AROMATIC POLYMER PARTICLES

[75] Inventor: Martin H. Tusim, Newark, Ohio

[73] Assignee: The Dow Chemical Company, Midland, Mich.

[21] Appl. No.: 247,195

[22] Filed: Sep. 21, 1988

[51] Int. Cl.[4] .............................. C08J 9/16; C08J 9/18
[52] U.S. Cl. ...................................... 521/60; 521/56; 521/98; 521/910; 264/DIG. 5
[58] Field of Search ................. 521/56, 60, 98, 910; 264/DIG. 5

[56] References Cited

U.S. PATENT DOCUMENTS 3,960,792  6/1976  Nakamura .......................... 521/79
4,636,527  1/1987  Suh et al. .......................... 521/79

FOREIGN PATENT DOCUMENTS 1086450  9/1980  Canada .

Primary Examiner—Morton Foelak

[57] ABSTRACT

Expandable and expanded particles are prepared from an alkenyl aromatic polymer and a volatile fluid blowing agent mixture of a first blowing agent of 1,1-difluoro-1-chloroethane; and a second blowing agent selected from normal pentane, isopentane, neopentane or mixtures of the various pentanes.

4 Claims, 1 Drawing Sheet

EXPANDABLE AND EXPANDED ALKENYL AROMATIC POLYMER PARTICLES

BACKGROUND OF THE INVENTION

This invention relates to expandable and expanded alkenyl aromatic polymer particles. The expandable alkenyl aromatic polymer particles are made with a specific volatile fluid blowing agent mixture of a first blowing agent of 1,1-difluoro-1-chloroethane and a second blowing agent of normal pentane, isopentane, neopentane or a mixture of two or more of these pentanes.

Alkenyl aromatic polymer particles or beads, which are expandable or expanded, are known to be highly desirable for a number of uses. One highly desirable use is protection in packaging articles for shipping. Typical materials are set forth in U.S. Pat. Nos. 3,066,382; 3,188,264; 3,251,728 and 3,933,959. Another use for the expandable alkenyl aromatic polymer particles is as molding material.

Fully halogenated chlorofluorocarbons have been identified as possibly having a negative effect on the earth's ozone layer. For this reason there is a need for decreasing and eliminating the use of such fully halogenated chlorofluorocarbons in all activities which use them, including the preparation of plastic foam products.

HCFC-142b (1,1-difluoro-1-chloroethane) has been disclosed as a possible substitute for CFC-12 (dichlorodifluoromethane) in the preparation of plastic foam products.

SUMMARY OF THE INVENTION

The present invention is expandable particles comprising an alkenyl aromatic polymer and a volatile fluid blowing agent mixture of first blowing agent of 1,1-difluoro-1-chloroethane and a second blowing agent of normal pentane (n-pentane), isopentane, neopentane or mixtures of those pentanes.

The present invention also includes expanded particles prepared from the expandable alkenyl aromatic polymer particles of the present invention.

HCFC-142b (1,1-difluoro-1-chloroethane) has been disclosed as a possible substitute for CFC-12 (dichlorodifluoromethane).

Surprisingly, greater amounts of HCFC-142b can be incorporated into the expandable and expanded alkenyl aromatic polymer particles than would have been expected when compared to the expandable and expanded alkenyl aromatic polymer particles made with CFC-12.

DETAILED DESCRIPTION OF ILLUSTRATIVE EMBODIMENTS

Figure 1:
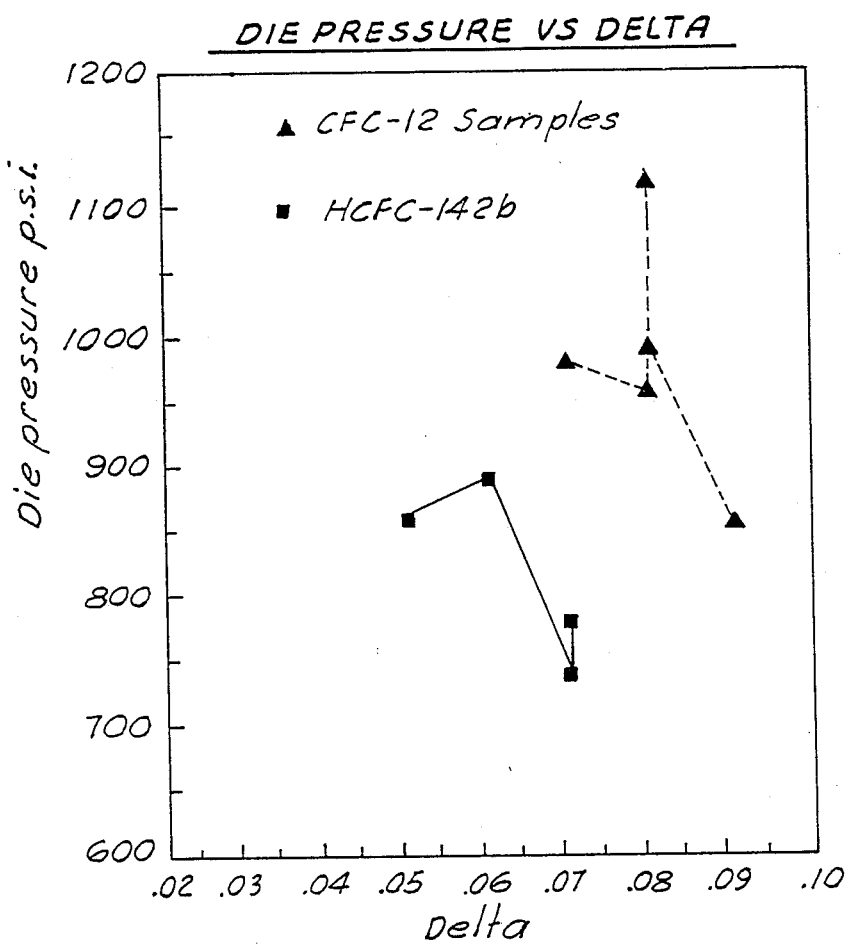
FIG. 1 is a plot of die pressure versus delta for the examples in Table 1.

The expandable and expanded particles of the present invention are alkenyl aromatic polymers containing a specific blowing agent mixture.

In the present invention of expandable and expanded alkenyl aromatic polymer particles, the term alkenyl aromatic polymer includes polymers or copolymers having in chemically combined form at least 50 percent by weight of at least one alkenyl aromatic compound having the general formula

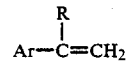

wherein the Ar represents an aromatic hydrocarbon radical or an aromatic halohydrocarbon radical of the benzene series and R is hydrogen or the methyl radical. Examples of such alkenyl aromatic resins are the solid homopolymers of styrene, α-methylstyrene, o-methylstyrene, m-methylstyrene, p-methylstyrene, ar-ethylstyrene, ar-vinylxylene, ar-chlorostyrene, or ar-bromostyrene; the solid copolymers of two or more of such alkenyl aromatic compounds with minor amounts of other readily polymerizable olefinic compounds such as divinylbenzene, methylmethacrylate or acrylonitrile, etc.

Preferably, the alkenyl aromatic polymer is polystyrene having an weight-average molecular weight ($M_w$) of 100,000 to 300,000.

The volatile fluid foaming agent mixture is a mixture of first blowing agent of 1,1-difluoro-1-chloroethane and a second blowing agent of normal pentane (n-pentane), isopentane, neopentane or mixtures of two or more of those pentanes. Optionally the volatile fluid foaming agent mixture has a third blowing agent of 1,1,1-trichloroethane. Preferably the volatile fluid foaming agent mixture contains less than about 50 weight percent by total weight of the mixture.

Preferably the volatile fluid foaming agent mixture contains at least 10 weight percent of 1,1-difluoro-1-chloroethane, most preferably the volatile fluid foaming agent mixture contains at least 20 weight percent of 1,1-difluoro-1-chloroethane, with the remainder being one or more of the various pentanes and optionally 1,1,1-trichloroethane.

The volatile fluid foaming agent mixture usually is employed in amounts corresponding to from about 5 to about 15 percent of the weight of the total formulation. After expansion part or all of the volatile fluid blowing agent mixture may or may not be retained in the expanded alkenyl aromatic polymer particle.

It is well known in the art to extrude foamable alkenyl aromatic polymer particles by cooling the viscous melt of the alkenyl aromatic polymer and the blowing agent below the blowing temperature under pressure and subsequently passing one or more strands into a lower or atmospheric pressure and rapidly cooling the strand into a solid or non-heat plastified state. It is also possible to extrude and expand these alkenyl aromatic polymer particles directly upon exiting a die.

It is also possible to include in the alkenyl aromatic polymer/blowing agent mixture other additives which are known in the art such as fire retardants, stabilizers, fillers, anti-static agents and colorants. Also those materials known as "cell-size control additives" may be incorporated into the alkenyl aromatic polymer/blowing agent mixture for use in the production of uniform extruded foam prior to extrusion from a die.

While the expandable alkenyl aromatic polymer particles produced may be in any form, particularly preferred are those forms suitable for packaging or dunnage purposes and those forms which after expansion are suitable for molding purposes.

The following examples and comparative examples illustrate the present invention. The weight percent blowing agent numbers are weight percent based on total mixture weight (polymer/blowing agent mixture). The blowing agent mixture percentages are weight percent of that blowing agent based on total blowing agent mixture weight. The polystyrene has a $M_w$ about 200,000 and constitutes the balance of the mixture.

EXAMPLES AND COMPARATIVE EXAMPLES

For the purpose of calculating density the following numbers are used.
Polystyrene—1.05 grams/cubic centimeter (g/cc)
1,1,1—trichloroethane—1.339 g/cc
Normal pentane—0.6262 g/cc
CFC-12—1.292 g/cc
HCFC-142b—1.12 g/cc The calculated density of the expandable particle is the sum of: (1) the weight percent of the polystyrene multiplied by the density of the polystyrene; and (2) the summation of the individual blowing agent weight percents multiplied by the individual blowing agent densities; with all weight percents based on total mixture weight.

To obtain the measured density first a sample of pellets are weighed. Then water and expandable particles are added to a bottle with a known volume to determine the volume of the expandable particles, which is the volume of the bottle minus the volume of the added water. Density is then the result of the measured weight divided by the measured volume.

After producing these expandable polystyrene particles these samples are then expanded in an atmospheric steam chamber for controlled periods of time at a temperature generally ranging from about 85° C. (centigrade) to about 105° C., preferably about 100° C. The expanded particles preferably should have a bulk density of less than about 0.40 pounds per cubic foot and most preferably should have a bulk density of less than about 0.30 pounds per cubic foot.

A typical expansion scheme will consist of a 3 minute exposure followed by a 24 hour aging time at room conditions, then a second 3 minute exposure followed by a second 24 hour aging time, and then a third 1½ minute exposure and a third 24 hour aging time. Many other expansion schemes are also possible and the present invention is not limited to the expansion scheme.

In the alternative method of producing expanded particles by foaming directly at the die, a sample could be taken prior to foaming for the purpose of determining the measured density.

For the purposes of these examples the polystyrene/blowing agent mixture is prepared in a conventional manner, heat-plastifying, then extruding and cooling the viscous melt of the polystyrene and the blowing agent below the blowing (foaming) temperature under pressure and subsequently passing a strand into atmospheric pressure and rapidly cooling the strand into a solid or non-heat plastified state as an expandable particle.

Acceptable expandable and expanded particles are produced when the difference in density (delta) between the calculated value and the measured value is less than or equal to about 0.07.

TABLE 1

| Blowing Agent Mixture Percentages | | | | Weight Percent Blowing Agent | Calculated Density (CD) | Measured Density (MD) | Delta (CD-MD) |
|---|---|---|---|---|---|---|---|
| Pentane normal | CFC-12 | HCFC-142b | 1,1,1-Trichloroethane | | | | |
| 50 | — | 50 | — | 9.2 | 1.03 | 1.00 | 0.03 |
| 50 | — | 50 | — | 7.8 | 1.04 | 0.97 | 0.07 |
| 50 | — | 50 | — | 8.3 | 1.04 | 0.97 | 0.07 |
| 40 | — | 60 | — | 9.6 | 1.04 | 0.99 | 0.05 |
| 40 | — | 60 | — | 7.3 | 1.04 | 0.98 | 0.06 |
| 90 | 10 | — | — | 6.9 | 1.03 | 0.96 | 0.07* |
| 80 | 20 | — | — | 7.4 | 1.03 | 0.95 | 0.08* |
| 70 | 30 | — | — | 7.2 | 1.03 | 0.95 | 0.08* |
| — | 60 | — | 40 | 8.9 | 1.07 | 0.99 | 0.08* |
| — | 60 | — | 40 | 11.2 | 1.08 | 0.99 | 0.09* |

*Not an Example of the present invention

As can be seen in Table 1 the delta (difference between calculated and measured density) for examples of the present invention is less than or equal to 0.07, while only 10 percent of CFC-12 (10/90 mixture of CFC-12/n-pentane) produced a delta of 0.07, an expandable particle that is is at the high end of the acceptable range. CFC-12 in an amount of 20 percent of the blowing agent mixture (20/80 mixture of CFC-12/n-pentane) has a delta of 0.08 and produces an unacceptable expandable particle.

Delta is a measure of the polystyrene/blowing agent mixture foaminess (which includes the expandable particles) before, at or after the die. As can be seen in FIG. 1, the die pressure, in psi (pounds per square inch) is plotted versus delta. The die pressure is the pressure in the die just prior to extrusion from the die. The use of HCFC-142b to produce an expandable pellet gives a decreased delta value, allowing a reduction of die pressure, thus allowing greater throughput from a given die, and also because the delta is lower, the tendency to foam before, at, or after the die is decreased.

As is apparent from the foregoing in this specification the present invention is susceptible of being embodied with various alterations and modifications which may differ particularly from those which have been described in the specification. For this reason it is to be fully understood that the examples are to be merely illustrative and should not be construed or interpreted as being restrictive or otherwise limiting of the present invention.

What is claimed is:
1. An expandable particle comprising:
   (A) an alkenyl aromatic polymer; and
   (B) a volatile fluid blowing agent mixture of
      (a) a first blowing agent of 1,1-difluoro-1-chloroethane; and
      (b) a second blowing agent selected from the group consisting of;
         (1) normal pentane;
         (2) isopentane;
         (3) neopentane; and

(4) mixtures of any of 1, 2 and 3, wherein the blowing agent mixture contains at least 10 weight percent 1,1-difluoro-1-chloroethane by total weight of the blowing agent mixture.

2. An expandable particle, as recited inn claim 1, wherein the volatile fluid blowing agent mixture has a third blowing agent of 1,1,1-trichloroethane.

3. An expandable particle, as recited in claim 1, wherein the difference between a calculated density and a measured density of the expandable alkenyl aromatic polymer particle is less than about 0.07 grams per cubic centimeter.

4. An expandable particle, as recited in claim 1, wherein the blowing agent mixture contains at least 20 weight percent 1,1-difluoro-1-chloroethane by total weight of the blowing agent mixture.

* * * * *